Aug. 29, 1961 E. L. W. JOHANSSON 2,997,818
AUTOMATIC GRINDING MACHINE
Filed June 12, 1958
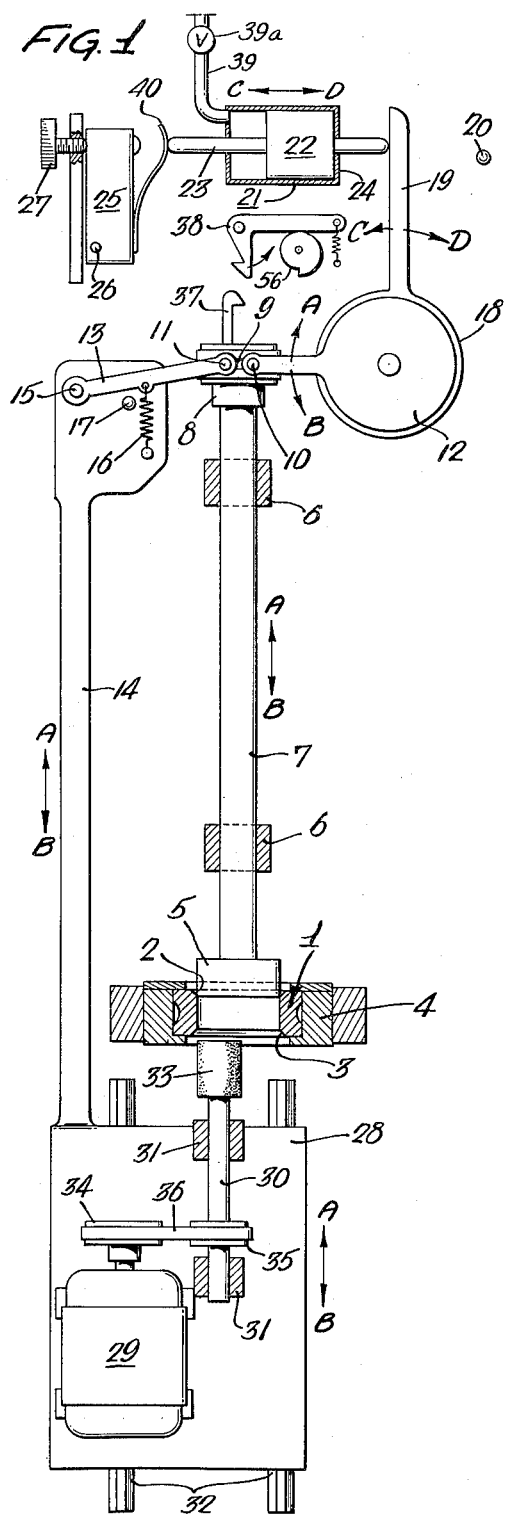
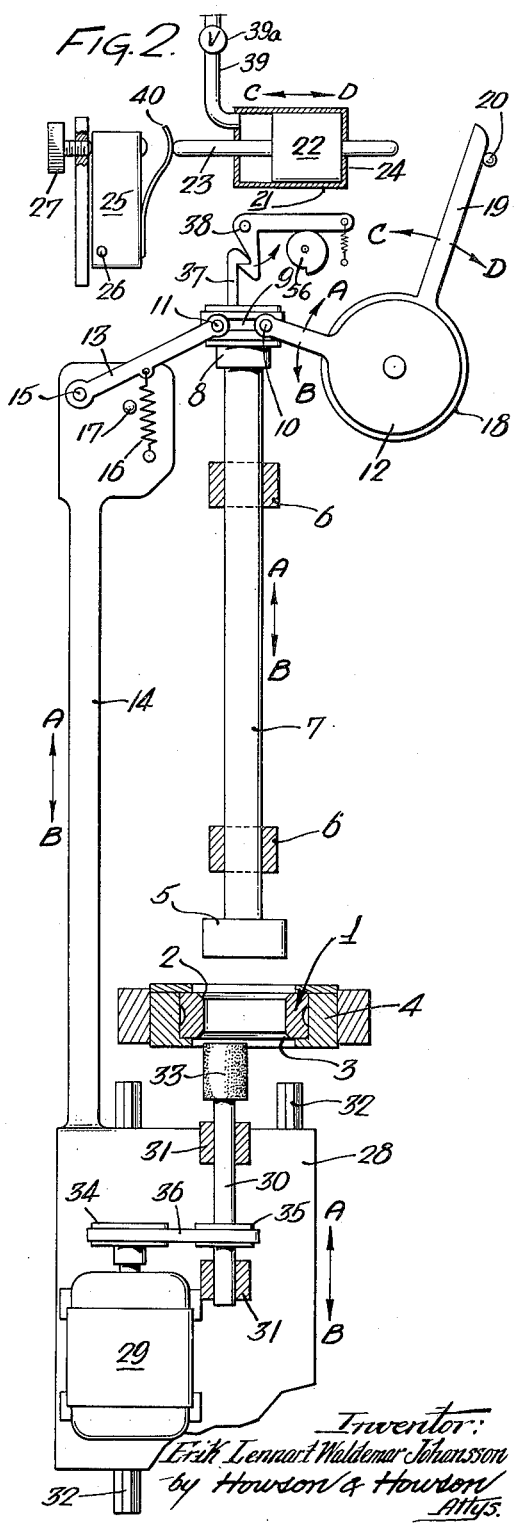
Inventor:
Erik Lennart Waldemar Johansson
by Howson & Howson
Attys.

2,997,818
AUTOMATIC GRINDING MACHINE

Erik Lennart Waldemar Johansson, Goteborg, Sweden, assignor to Aktiebolaget Svenska Kullagerfabriken, Goteborg, Sweden, a corporation of Sweden
Filed June 12, 1958, Ser. No. 741,660
Claims priority, application Sweden June 15, 1957
4 Claims. (Cl. 51—165)

When grinding in automatic grinding machines having reciprocating gauges having a contact member to stop the grinding operation at a certain position relative to a workpiece having a bevel between an end plane thereof and a cylindrical surface perpendicular to the said end plane, e.g. a race ring of a ball bearing, it has been found that the diameters of the workpieces produced have varied somewhat. The reason for this is that since the axial dimension of the bevel varies considerably, the depth at which the gauge contacts the cylindrical surface will vary with varying depth of the bevel.

The present invention has for its purpose to eliminate this disadvantage or, in other words, to compensate for different depths of bevel so that the gauge will always actuate the contact at the same distance from the junction of the bevel and the cylindrical surface. It is characterized substantially by a mechanism comprising a pair of members relatively adjustable to each other, one of the said members being connected to the gauge and the other of said members being disposed to actuate a disconnecting member, the relative positions of the members being determined by the position of contact of the gauge relative to the bevel, whereby the distance between the position of the gauge at the moment of disconnecting and the junction of the bevel with the cylindrical surface of the finished work piece will be maintained constant.

The invention is illustrated in the accompanying drawing, in which FIGURES 1 and 2 show diagrammatically two different working positions of the device.

In the figures the numeral 1 indicates the work piece to be ground, in this case the race ring of a single-row deep-groove ball bearing. The workpiece, the bevelled edges of which are designated 2 and 3, is mounted in a rotatable chuck 4. The diameter of the ring 1 is gauged by a gauge 5 carried on a gauge rod 7, which is both rotatable and axially displaceable in bearings 6. The other end of the gauge rod 7 is rotatably connected to a block 8, the upper part of which is provided with a catch 37 and which also has a groove 9 perpendicular to the gauge rod, in which two pins 10 and 11 slide. The pin 10 is riveted to a friction disk 12 having an arm, and the pin 11 is fixed to another arm 13 which is pivotable about a bearing pin 15 on a connecting rod 14. The arm 13 is connected to a spring 16 acting in a direction toward a stop 17.

The circular portion of the friction disk 12 contacts with another friction disk 18 coaxial therewith and having an arm 19 arranged to contact a stop member 20. The figures further show a cylinder 21 in which is a piston 22 having a piston rod 23. The cylinder is further provided with a head 24. Air is admitted to actuate the piston from a pipe 39, connected to a source of air pressure not shown. The piston rod 23 actuates a spring 40 on a microswitch 25 which is pivotable about a pin 26 and the position of which can be adjusted by a screw 27.

A table 28 is arranged to slide on a pair of guides 32 and carries a driving motor 29 and bearings 31, in which is mounted a grinding wheel spindle 30 carrying a grinding wheel 33. The grinding wheel is driven by the motor through a pair of pulleys 34 and 35 and a belt 36. The connecting rod 14 before mentioned is attached to the table 28. A catch 38 mounted on any suitable portion of the machine is provided to engage the catch 37.

The letters A, B, C and D designate directions of movement as indicated by the arrows. In other words, A indicates movement in an upward direction, B downwards, C to the left and D to the right.

The device functions as follows: The grinding of, for instance, the inner cylinder surface of a race ring is divided into several different phases: rough grinding, during which out-of-roundness and other irregularities in shape are eliminated, and during which the feed is greater and the grinding time predetermined, and finish grinding, during which the diameter is gauged and the ground surface is given its final finish and dimension, and during which the rate of feed is less and the grinding time can be varied. Immediately after having finished ground one work piece and before the next work piece is inserted in the chuck 4, the slide 28 is caused to move in the direction A, until the catch 38 engages the catch 37 on the gauge rod 7, whereby the gauge is disconnected during the rough grinding period.

During the movement of the gauge the friction disk 12 is turned in the direction A, carrying with it the friction disk 18 which is turned in the direction D, until the arm 19 of the latter engages the stop member 20, which is so located, that the two friction disks are turned relative each other a few degrees as shown in FIGURE 2, thus forming a linkage of variable effective length. At the beginning of the finish grinding operation, the gauge rod is released thereby, and the catch 38 is swung aside through the action of a cam 56. At the same time the pipe 39 is opened to permit a momentary pneumatic pressure to act on the piston 22 which is forced in the direction D against the head 24 of the cylinder 21. Due to the action of the spring 16, the gauge is moved in the direction B until it engages the bevel 2 of the work piece. FIG. 1 illustrates this position. Due to the relative rotation of the friction disks 12 and 18 mentioned above, the angle between the arms of these disks in the position shown in FIG. 2 will be less than the smallest angle which can occur during gauging, namely in case the bevel on the work piece is entirely lacking. When the gauge is now caused to move in the direction B, the friction disks will be turned in the directions B and C respectively whereby the arm 19 will be forced against the piston rod 23 whereby there will be relative rotation between the friction disks. The gauge 5 now rests against the bevel 2 and the arm 19 engages the piston rod 23. The proper position of the gauge relative to the disconnecting mechanism has now been determined and finish grinding can begin. The air pressure on the piston 22 is now released through a valve 39$^a$ on pipe 39. The reciprocating movement of the slide 28 is transmitted to the gauge through the connecting rod 14 and the arm 13 thereby causing the gauge to engage the race ring for each movement in the direction B. If the diameter of the bore is too small, the gauge will contact the bevel of the ring and take part in the rotation of the ring. The spring 16 is arranged so that movement of the slide in the direction B can continue in spite of the fact that movement of the gauge in the same direction is prevented by contact with the bevel of the ring. When, however, the diameter of the ring reaches the desired dimension, the gauge penetrates so far into the ring in the direction B, that the piston rod 23 depresses the spring 40 of the microswitch 25, and the grinding operation is discontinued. The finished ring is removed, after which the cycle is repeated.

At the start of a typical cycle of operation of the apparatus of the present invention, the parts are in the position shown in FIG. 2 and the machine is set for the rough grinding operation. The cam 56, which may be timed with the rough grinding sequence, effects release of the gauge 5 through the catch 37 at the end of the rough grinding period. Thereafter the spring 16 moves the gauge toward the work-piece into engagement with the bevelled edge thereof. At this point the piston 22 is maintained in engagement with the wall 24 of the cylinder 21 by means of pressure being exerted through the line 39. Accordingly, the arm 19 of the friction disc 18 engages the rod 23 and assumes a predetermined position relative to the arm of the friction disc 12. At the beginning of the finish grinding cycle, the pressure on the piston 22 is released by opening the valve 39ª. Thereafter the gage is reciprocated back and forth with the grinder during the finish grinding cycle as the grinder traverses the inner periphery of the work-piece. When the internal surface of the work-piece has been ground to a predetermined dimension, the gauge enters the work-piece due to the urging of the spring 16. This effects rotation of the friction disc 12 in the direction of the arrow B, which in turn carries the arm 19 of the friction disc 18 in the direction of the arrow C, thereby moving the rod 23 into engagement with the spring 40, which in turn actuates a microswitch 25 to terminate the grinding cycle.

The invention is not limited to the form thereof described above. For example, the friction disks 12 and 18 may be replaced by a cylinder and a piston displaceable therein or any similar device in which two members are movable relative each other under friction.

The device is equally applicable when grinding external cylindrical surfaces.

I claim:

1. An automatic grinding machine for grinding cylindrical surfaces of work pieces wherein the said surface terminates in a chamfer coaxial with the surface, said machine comprising means for terminating the grinding operation, and a reciprocating gage operatively connected to the terminating means to actuate the latter, said machine being characterized by a pair of members connected to said gauge forming, jointly, a linkage of variable effective length, and means for initially relatively adjusting the said members to bring one of the members into a position predeterminedly remote from the said terminating means when the gage is in contact with the chamfer whereby a movement of the gage to a predetermined position relative to the junction of said cylindrical surface and said chamfer is required to actuate the terminating means.

2. An automatic grinding machine according to claim 1 characterized thereby that the members which are adjustable relative to each other are rotatably displaceable relative to each other against frictional forces acting between them.

3. An automatic grinding machine according to claim 1, wherein the means for the said initial relative adjustment of the members comprises a relatively fixed cylinder between the one said member and the terminating means, a piston in said cylinder forming a connecting rod between the one said member and the terminating means, and freely movable in the cylinder during reciprocation of the gage, and fluid pressure means for moving the piston into the end of the cylinder adjoining the said member.

4. An automatic grinding machine for grinding cylindrical surfaces of work pieces wherein the said cylindrical surface terminates in a chamfer coaxial with the surface, said machine comprising means for terminating the grinding operation, a gage reciprocatory axially of the said cylindrical surface, and means for operatively connecting the gage to the terminating means to actuate the latter, said operative connecting means comprising a pair of relatively adjustable members forming a linkage of variable effective length and connected one to the gage and the other to the terminating means, a connecting rod between the said other member and the terminating means, means for adjusting the rod into a predetermined position with respect to the terminating means, from which position a predetermined movement of the rod is required to actuate the terminating means, means for relatively adjusting the said members so that when the rod is in said position the gage will lie in contact with the said chamfer, and means for reciprocating the gage simultaneously with the grinding operation whereby in each stroke thereof the movement of the said connecting rod toward the terminating means is limited by contact of gage with the chamfer until the grinding operation has progressed to the point where the gage clears the chamfer.

References Cited in the file of this patent

UNITED STATES PATENTS

| 1,731,719 | Kempton et al. | Oct. 15, 1929 |
| 2,826,875 | Townsend | Mar. 18, 1958 |